US010305755B2

(12) United States Patent
Cheng

(10) Patent No.: US 10,305,755 B2
(45) Date of Patent: May 28, 2019

(54) RELIABILITY AND PERFORMANCE ANALYSIS SYSTEM

(71) Applicant: ZEROPLUS TECHNOLOGY CO., LTD., New Taipei (TW)

(72) Inventor: Chiu-Hao Cheng, New Taipei (TW)

(73) Assignee: ZEROPLUS TECHNOLOGY CO., LTD., New Taipei (TW)

( * ) Notice: Subject to any disclaimer, the term of this patent is extended or adjusted under 35 U.S.C. 154(b) by 224 days.

(21) Appl. No.: 15/617,441

(22) Filed: Jun. 8, 2017

(65) Prior Publication Data

US 2017/0366419 A1    Dec. 21, 2017

Related U.S. Application Data

(60) Provisional application No. 62/347,966, filed on Jun. 9, 2016.

(30) Foreign Application Priority Data

Jun. 6, 2017    (JP) ................................ 106118642 A

(51) Int. Cl.
*H04L 12/24* (2006.01)
*H04L 12/26* (2006.01)

(52) U.S. Cl.
CPC ............ *H04L 43/04* (2013.01); *H04L 41/142* (2013.01); *H04L 43/0894* (2013.01); *H04L 43/12* (2013.01); *H04L 43/0847* (2013.01)

(58) Field of Classification Search
CPC combination set(s) only.
See application file for complete search history.

(56) References Cited

U.S. PATENT DOCUMENTS 4,972,138 A    11/1990    Bush
6,442,725 B1 *    8/2002    Schipke ............. G01R 31/3177
                                                            714/741
(Continued)

FOREIGN PATENT DOCUMENTS

CN    1527064 A    9/2004
TW    I224195 B    11/2004
(Continued)

OTHER PUBLICATIONS

Examination Report for TW1061186642, dated Jan. 22, 2018, Total of 2 pages.

(Continued)

*Primary Examiner* — El Hadji M Sall
(74) *Attorney, Agent, or Firm* — Tracy M. Heims; Apex Juris, pllc.

(57) ABSTRACT

A reliability and performance analysis system is disclosed. The reliability and performance analysis system includes a logic analyzer and a server. The logic analyzer includes a set of probes capable of retrieving signals of a digital device. The retrieved signals are integrated and stored into a storage module of the logic analyzer. The retrieved signals are then transmitted to a remote server which are utilized to select specific signals to analyze the reliability and performance of the digital device. The storage module can increase the stability of the logic analyzer such that the logic analyzer can proceed a long-term signal retrieving process and a user can obtain an analysis result by connecting to the server directly.

20 Claims, 7 Drawing Sheets

(56) References Cited

U.S. PATENT DOCUMENTS

| | | | | |
|---|---|---|---|---|
| 7,630,300 B2* | 12/2009 | Warren | ............... | H04L 12/433 |
| | | | | 370/222 |
| 2006/0280313 A1* | 12/2006 | Schmidmer | ......... | H04M 3/2236 |
| | | | | 381/56 |
| 2014/0024352 A1* | 1/2014 | Huang | ................... | H04W 4/16 |
| | | | | 455/417 |

FOREIGN PATENT DOCUMENTS

| | | |
|---|---|---|
| TW | M450148 U | 4/2013 |
| TW | 201602603 A | 1/2016 |

OTHER PUBLICATIONS

Search Report for TW1061186642, dated Jan. 20, 2018, Total of 1 page.
English Abstract of corresponding document: US2004204923 (A1) for CN1527064 (A).
English Abstract of TW201602603 (A), Total of 1 page.
English Abstract of TWI224195 (B), Total of 1 page.
English Abstract of TWM450148 (U), Total of 1 page.

* cited by examiner

RELIABILITY AND PERFORMANCE ANALYSIS SYSTEM

BACKGROUND OF THE INVENTION

1. Technical Field

The present invention is related to a signal analysis device, and more particularly to a reliability and performance analysis system which utilizes internet technology.

2. Description of Related Art

Logic analyzers can be utilized to evaluate the performance of a hardware because of its capability of retrieving input signals and output signals from a hardware. Hence, the logic analyzers have been widely used in the industry. However, the transmission efficiency of the logic analyzers is usually too slow to match its signal transmission rate with its signal retrieving rate. Hence, some errors may occur within the logic analyzers, and the signals of the digital device cannot be retrieved completely.

Moreover, when the logic analyzer proceeds a long-term signal retrieving, the user usually needs to go to the hardware's location to obtain the analysis result. It is inconvenient for the user and the efficiency of the signal analysis process is therefore decreased.

BRIEF SUMMARY OF THE INVENTION

In view of the above, the present invention is to provide a reliability and performance analysis system which utilizes a logic analyzer to retrieve input/output signals of a digital device to analyze the reliability and performance of the digital device.

The present invention also provides a reliability and performance analysis system which includes a logic analyzer having a storage module capable of storing signal data so as to achieve a result of long-term and stable signal retrieving.

The present invention further provides a reliability and performance analysis system which can transmit signal data or a statistic result via an internet connection so as to enable a remote user to obtain the analysis result.

The present invention provides a reliability and performance analysis system. The reliability and performance analysis system includes a logic analyzer and a server. The logic analyzer includes a set of probes, a programmable array module, a first transmission interface, a storage module and a second transmission interface. The set of probes are electrically connected to the transmittal terminal of the digital device and adapted to continuously retrieve a plurality of input signals received by the transmittal terminal and a plurality of output signals transmitted from the transmittal terminal. The programmable array module is electrically connected to the set of probes and adapted to receive the plurality of input signals and the plurality of output signals retrieved by the set of probes, and to integrate the plurality of input signals and the plurality of output signals into a signal data. The programmable array module and the storage module are electrically connected with the first transmission interface. The first transmission interface is adapted to receive the signal data transmitted from the programmable array module and to transmit the signal data to the storage module via a first transmission rate so as to store the signal data into the storage module. The second transmission interface is electrically connected to the programmable array module and adapted to receive the signal data transmitted back from the storage module to the programmable array module via the first transmission interface, and to transmit the signal data to a remote end via a second transmission rate. The server is located at the remote end of the logic analyzer and connected to the second transmission interface of the logic analyzer via an internet connection. The server is adapted to receive the signal data transmitted from the logic analyzer, select a plurality of first specific signals from the plurality of input signals and a plurality of second specific signals from the plurality of output signals which are corresponding to the plurality of first specific signals, and compare the plurality of first specific signals and the plurality of second specific signals to generate a statistic result.

According to an embodiment of the present invention, the reliability and performance analysis system further includes a screen. The screen can be physically connected to the server or be located at a remote end. In addition, the programmable array module includes a conversion circuit, a first buffer circuit and a second buffer circuit. The conversion circuit is electrically connected to the set of probes, and is adapted to receive the plurality of input signals and the plurality of output signals retrieved by the set of probes, and to integrate the plurality of input signals and the plurality of output signals into the signal data. The conversion circuit and the first transmission interface are electrically connected with the first buffer circuit. The first buffer circuit is adapted to receive the signal data, and to convert the signal data into a first data format and transmit the signal data to the first transmission interface. The first transmission interface and the second transmission interface are electrically connected with the second buffer circuit. The second buffer circuit is adapted to receive the signal data transmitted from the first transmission interface, and to convert the signal data into a second data format and to transmit the signal data to the second transmission interface. The second transmission rate is not greater than the first transmission rate.

According to an embodiment of the present invention, the digital device includes two transmittal terminals. Wherein, one of the two transmittal terminals is an input terminal, while another one of the two transmittal terminals is an output terminal. The plurality of input signals are received by the input terminals, and the plurality of output signals are transmitted from the output terminals. The step of comparing the plurality of first specific signals and the plurality of second specific signals is to compare a time difference or the quantity of the plurality of first specific signals and the plurality of second specific signals.

According to an embodiment of the present invention, the reliability and performance analysis system further includes a user computer. The user computer is electrically connected to the second transmission interface of the logic analyzer and is connected to the server located at the remote end via an internet connection. The user computer can store the signal data transmitted from the logic analyzer first, and then to transmit the signal data to the remote end. The user computer also can directly select a plurality of first specific signals from the plurality of input signals and a plurality of second specific signals from the plurality of output signals which are corresponding to the plurality of first specific signals, and compare the plurality of first specific signals and the plurality of second specific signals to generate a statistic result. The statistic result is then transmitted from the user computer to the remote end. Meanwhile, the server is only adapted to receive the statistic result but also to display the statistic result on the screen.

By utilizing the above configuration, the reliability and performance analysis system of the present invention not only can retrieve the input/output signals of a digital device and analyze the reliability and performance thereof, the storage module of the system can also be utilized to temporarily store the signal data. Hence, the system can achieve a long-term and stable signal retrieving result. Moreover, the system can transmit the signal data or the statistic result via an internet connection such that the user can obtain the analysis result from a remote end. The convenience of utilizing the system is therefore enhanced.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 5 is a block diagram of a reliability and performance analysis system of a second embodiment according to the present invention.

DETAILED DESCRIPTION OF THE INVENTION

Figure 1:
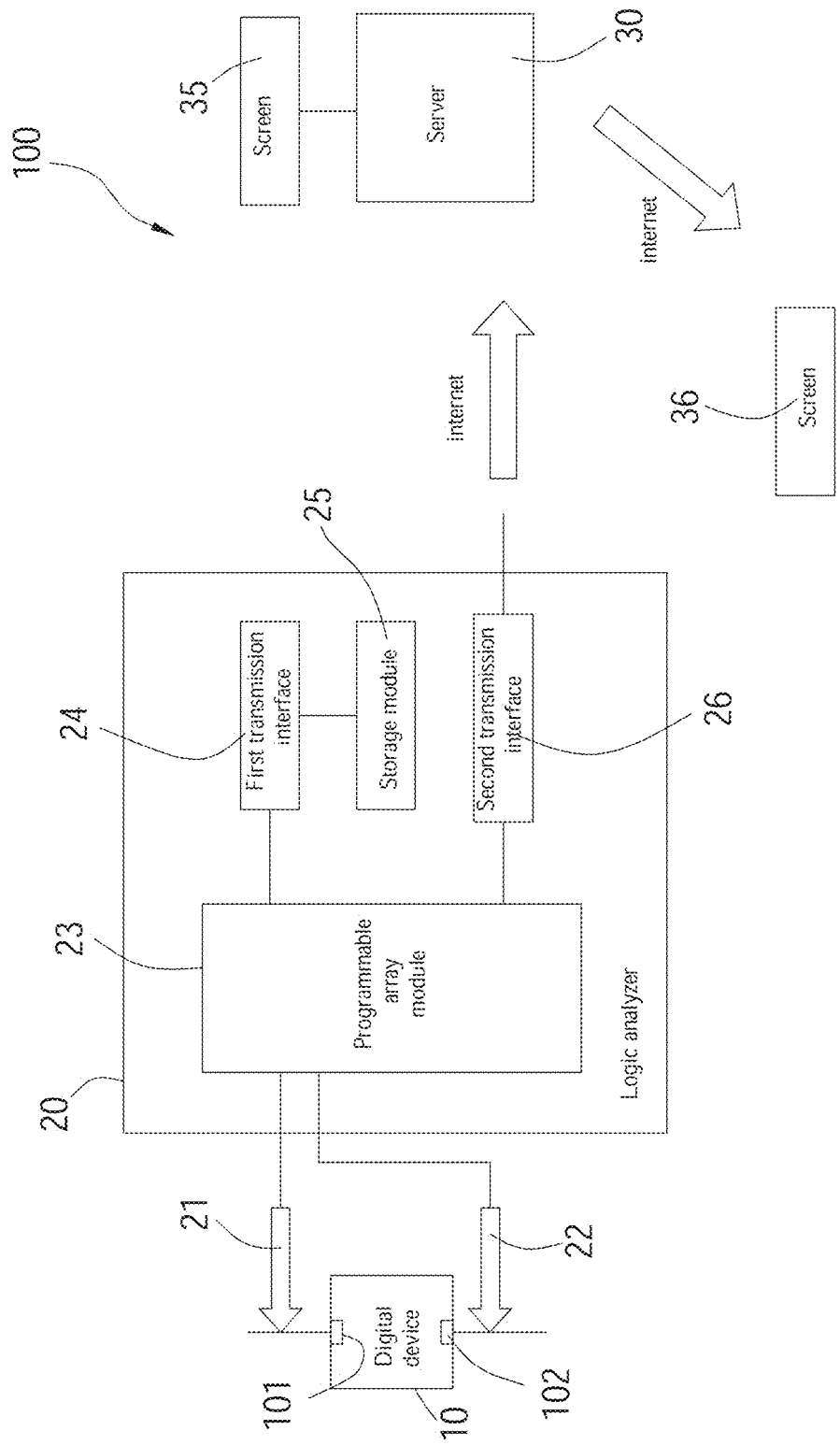
FIG. 1 is a block diagram of a reliability and performance analysis system of a first embodiment according to the present invention.

The following illustrative embodiments and drawings are provided to illustrate the disclosure of the present invention, these and other advantages and effects can be clearly understood by persons skilled in the art after reading the disclosure of this specification. As shown in FIG. 1, a reliability and performance analysis system 100 of a first embodiment according to the present invention is illustrated. The reliability and performance analysis system 100 is adapted to analyze a digital device 10. The digital device 10 can be a quality inspection equipment located in a production line of a factory. The digital device 10 includes two transmission terminals 101, 102, wherein one of the transmission terminals is an input terminal 101 and the other one of the transmission terminals is an output terminal 102. The input terminal 101 is connected to an image capturing lens (not shown) adapted to capture a series of images of products to be inspected. The captured images are transmitted to the input terminal 101 of the digital device 10. The digital device 10 can compare the product images with a standard image stored therein to determine the quality of each of the products, i.e., qualified or defective, and output the inspection result via the output terminal 102. Wherein, the input terminal 101 and the output terminal 102 can be USB (Universal Serial Bus) ports, but it is not limited thereto.

The reliability and performance analysis system 100 includes a logic analyzer 20, a server 30 and two screens 35, 36.

The logic analyzer 20 includes two probes 21, 22, a programmable array module 23, a first transmission interface 24, a storage module 25, and a second transmission interface 26. Wherein, the programmable array module 23 can be a field programmable gate array module (FPGA).

Each of the two probes is electrically connected to the input terminal 101 and the output terminal 102 of the digital device 10 respectively. The probe 21 is adapted to retrieve an input signal from the image signals transmitting to the input terminal 101, i.e., the image signals transmitted from the image capturing lens to the input terminal 101; while the probe 22 is adapted to retrieve an output signal from the inspection results transmitting out from the digital device 10 via the output terminal 102.

The programmable array module 23 is electrically connected to the two probes 21, 22, the first transmission interface 24 and the second transmission interface 26. The programmable array module 23 is adapted to receive the input signal and the output signal retrieved by the probes 21, 22 and to integrate the retrieved signals into a signal data.

The programmable array module 23 and the storage module 25 are electrically connected with the first transmission interface 24. The first transmission interface 24 is adapted to receive the signal data from the programmable array module 23 and to transmit the signal data to the storage module 25 with a first transmission rate. The signal data is then stored into the storage module 25. In this embodiment, the first transmission rate 24 can be a memory bus which provides a transmission rate of 8000 MB/s. That is, the first transmission rate can be 8000 MB/s. The storage module 25 can be a partial storage area located in the internal memory of the logic analyzer 20. The internal memory of the logic analyzer 20 can be a Double-Data-Rate Three Synchronous Dynamic Random Access Memory (DDR3 SDRAM). For example, when the internal memory includes a 16 GB DDR3 SDRAM, a 4 GB storage area of the internal memory can be utilized as the storage module 25. However, it is not limited thereto.

The second transmission interface 26 is electrically connected to the programmable array module 23. The second transmission interface 26 is adapted to receive from the programmable array module 23 the signal data transmitted back from the storage module 25 through the first transmission interface 24, and to transmit the signal data to a remote end via a second transmission rate. In this embodiment, the second transmission interface 26 can be a network interface card which provides a transmission rate of 125 MB/s. That is, the second transmission rate is 125 MB/s. The second transmission rate is not greater than the first transmission rate.

Figure 2:
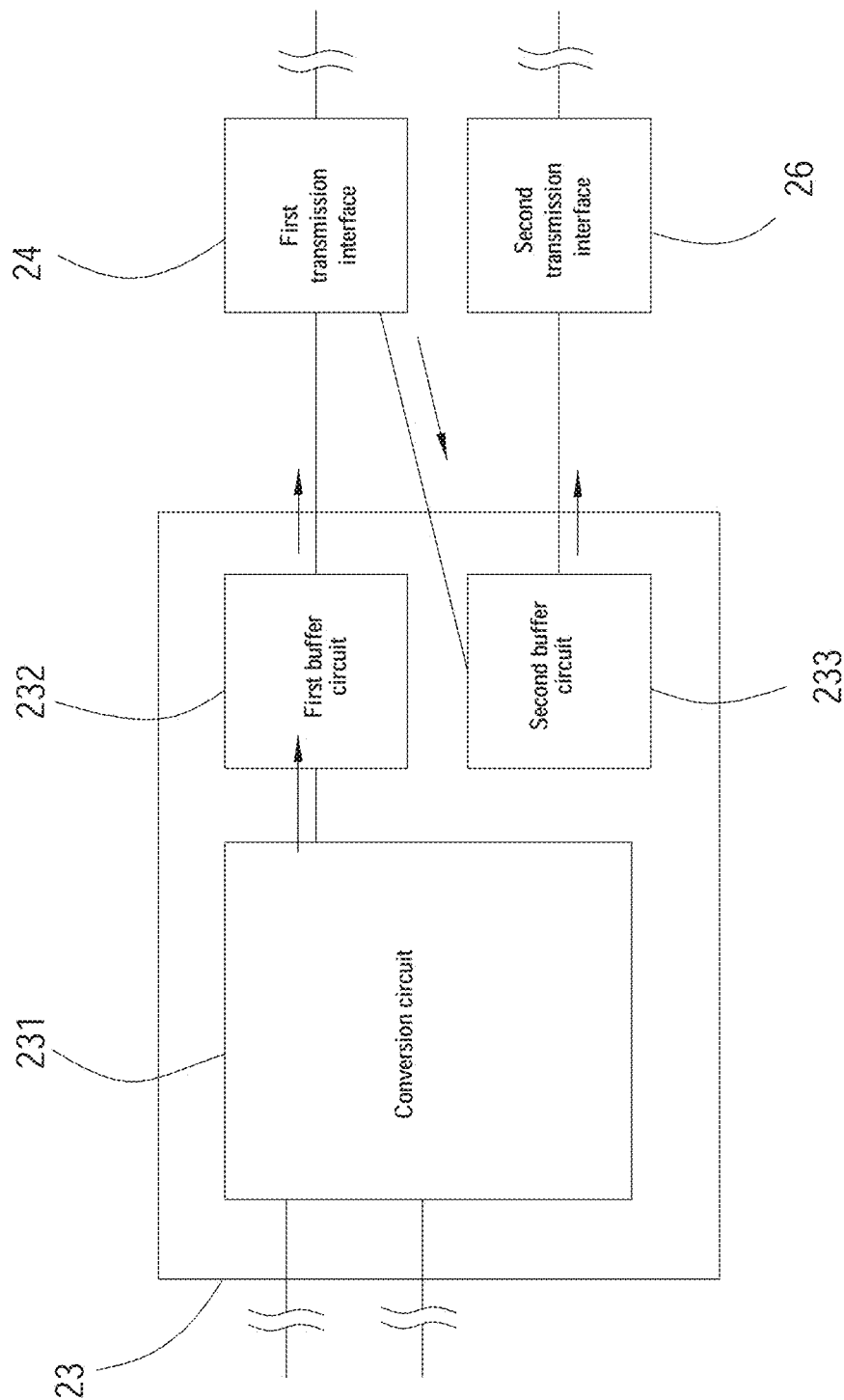
FIG. 2 is block diagram of the programmable array module of the logic analyzer of the first embodiment.

As shown in FIG. 2, the programmable array module 23 includes a conversion circuit 231, a first buffer circuit 232 and a second buffer circuit 233. The conversion circuit 231 is electrically connected to the probes 21, 22, while the conversion circuit 231 and the first transmission interface 24 are electrically connected with the first buffer circuit 232, and first transmission interface 24 and the second transmission interface 26 are electrically connected with the second buffer circuit 233. The conversion circuit 241 is adapted to receive and convert the input signal and the output signal into the signal data, and to transmit the signal data to the first buffer circuit 232. After receiving the signal data, the first buffer circuit 232 is adapted to convert the signal data into a first data format which can be received by the first transmission interface 24, and to transmit the converted signal data to the first transmission interface 24. When the signal data stored in the storage module 25 reaches a predetermined size, the signal data would be output to the second buffer circuit 233 through the first transmission interface 24. After receiving the signal data from the first transmission interface 24, the second buffer circuit 233 is adapted to convert the received signal data into a second data format which can be received by the second transmission interface 26, and then transmit the converted signal data to the second transmission interface 26.

The server 30 is located at a remote end from the logic analyzer 20, as shown in FIG. 1. The server 30 is connected to the second transmission interface 26 of the logic analyzer 20 via the internet and is adapted to receive the signal data from the logic analyzer 20. The server 30 is capable of selecting a plurality of first specific signals from the input signal of the signal data, selecting a plurality of second specific signal from the output signal of the signal data corresponding to the first specific signal, and comparing the first specific signal and the second specific signal to generate a statistic result.

The two screens 35, 36 are both connected to the server 30, wherein one screen 35 is a liquid crystal display which is physically connected to the server 30; while the other screen 36 is a screen of a mobile phone which is located at a remote end from the server 30, and is connected to the server 30 via an internet connection. Both of the two screens 35, 36 can display the statistic result mentioned above.

Before analyzing the signal data, the server 30 needs to select a specific signal which can reflect the performance or reliability of the digital device 10. A user can utilize a program to automatically select a specific signal which meets a specific condition according to the bus types connected to the probes 21, 22. Generally, based on the communication protocol known in the art, the user can select the specific signal from the bus waveform of the signal data. Moreover, the user also can define a waveform of the signal data and its corresponding interpretation by himself.

Figure 3:
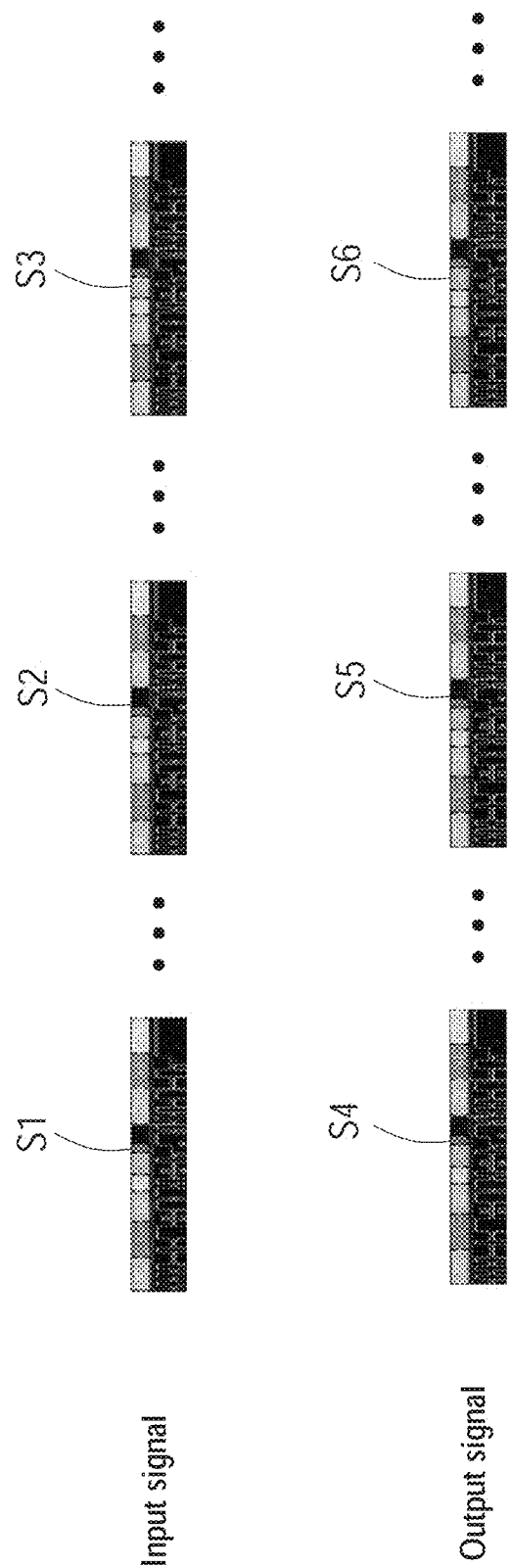
FIG. 3 is a schematic view of the selected first specific signals and the selected second specific signals of the first embodiment.
Figure 4:
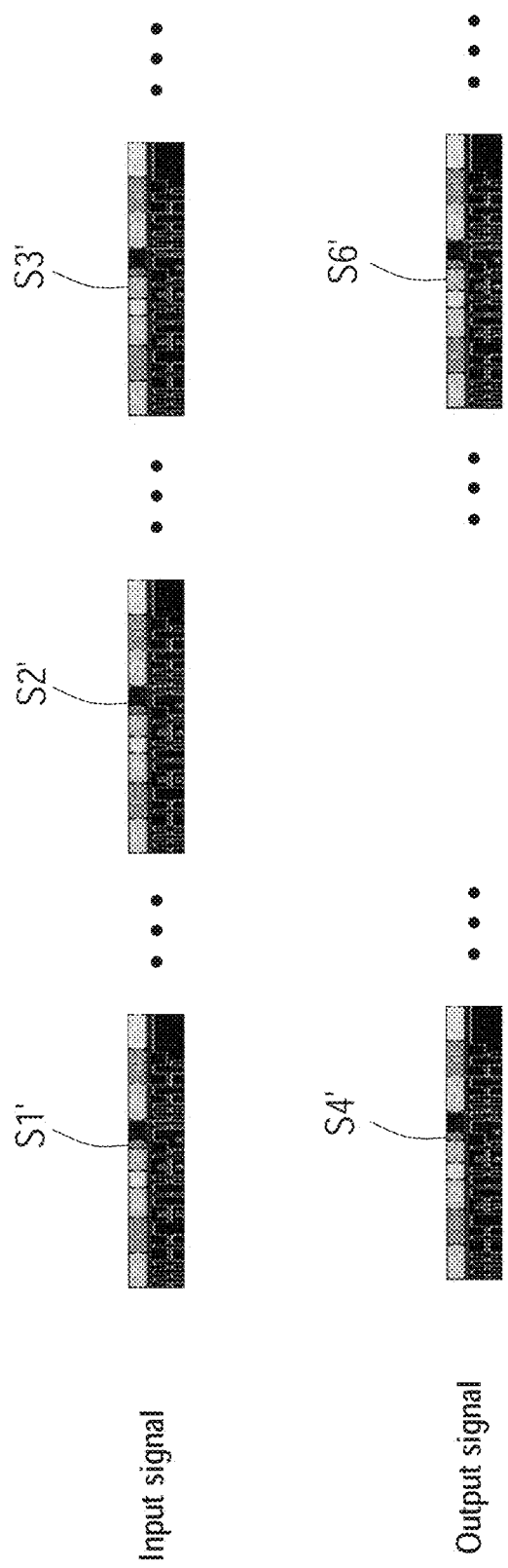
FIG. 4 is another schematic view of the selected first specific signals and the selected second specific signals of the first embodiment.

To further detail features in this embodiment, both of the input signal and the output signal retrieved by the probes 21, 22 are USB pockets. The server 30 can select the waveform from the header of the pockets based on USB communication protocol. For example, a first pocket of each product image signal transmitted from the image capturing lens can be defined as a first specific signal; while a first pocket of each inspection result transmitted from the digital device 10 can be defined as a second specific signal. Then, the process for selecting the specific signals can be performed. Referring to FIG. 3, the waveforms of the selected specific signals are shown in the figure. Under normal circumstances, the digital device 10 would transmit a corresponding signal including an inspection result in response to each of the image signals. That is, the digital device 10 would respectively transmit the second specific signal S4, S5 and S6 in response to each of the first specific signals S1, S2 and S3. However, if the physical signals are disconnected or the dialogue unit is inactive within the digital device 10, part of the second specific signals would not be appeared normally, as shown in FIG. 4 (only the specific signals S4' and S6' are shown in the figure.) Therefore, by utilizing the logic analyzer 20 to record the specific signals for a long time period, the server 30 can compare the quantity of the first specific signals S1, S2, S3, S1', S2, 'S3' with the quantity of the corresponding second specific signals S4, S5, S6, S4', S5, 'S6' so as to calculate and obtain a statistic result which can reflect an error rate or a correct rate of the digital device 10. In addition, by continuously collecting the specific signals related to the conditions which cause the digital device 10 to fail to transmit corresponding signals, such as the condition that none of the corresponding second specific signals is generated after the digital device 10 receiving the first specific signal S1, as shown in FIG. 4, it is able to find out the reason for the error and to solve the problem.

Figure 5:
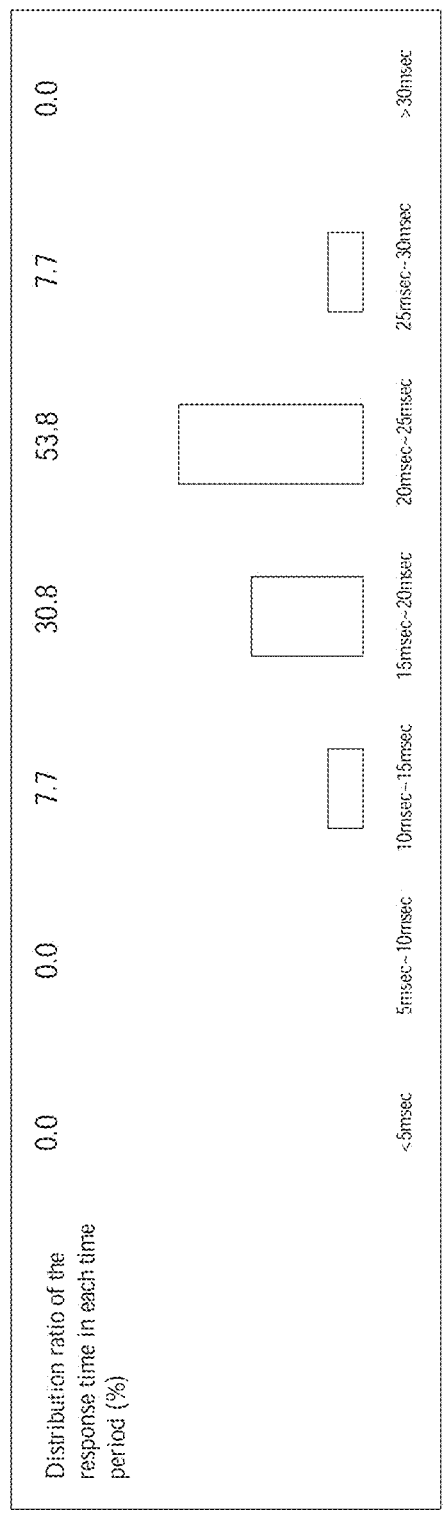
FIG. 5 is a distribution ratio diagram of the digital device's response time obtained by the analysis process of the first embodiment.

In addition, the server 30 can measure a time difference between each of the first specific signals S1, S2, S3 and the corresponding second specific signals S4, S5, S6 to obtain a response time required for each inspection in the digital device 10. Thereafter, according to the difference between each response time of the inspection process, a distribution ratio diagram of each response time within an overall time period can be generated by the server 30, as shown in FIG. 5, so as to obtain a distribution of time required for the inspection process. For example, as shown in FIG. 5, the longest delay time of the digital device 10 is within the time interval of 20 to 25 ms. After obtaining this information, the user can detect and analyze the reason for the inspection time fallen within this time period so as to modify the detail design and improve the performance of the digital device 10.

During the process of retrieving signals by the probes 21, 22, the conversion circuit 231 of the programmable array module 23 can convert the retrieved signal into the signal data and transmit it to the first buffer circuit 232. Then, the signal data is transmitted to the storage module 25 through the first transmission interface 24 and then stored into the storage module 25. When the signal data stored in the storage module 25 reaches a predetermined size, such as 4 GB, the signal data with the predetermined size is further transmitted to the second buffer circuit 233 through the first transmission interface 24. The signal data with the predetermined size is then transmitted to the server 30 through the second transmission interface 26 so as to be stored and analyzed within the server 30.

The signal data is written into the storage module 25 first, then transmitted out from the storage module 25 and transmitted to the server 30. Therefore, even the signal data cannot be real-time uploaded to the server from the logic analyzer due to network blocking or system error, the inspection and transmission of the logic analyzer 20 would not be affected so as to achieve a long-term and stable signal retrieving result.

Moreover, the user can read the analysis result stored in the server 30 via any one of the two screens 35, 36 and it is not necessary for the user to go to the location of the digital device 10 such that the system 100 is greatly improved in its convenience.

In addition, the user can further check the waveform diagram and data displayed on the screens 35, 36 as shown in FIG. 3 and FIG. 4 in addition to the analysis result as shown in FIG. 5. In observing the waveforms, the user can further make a selection by touching one of the waveforms to check its related information, such as position, length, corresponding feedback signal data, etc. For example, after the user selecting the first specific signal S1, additional information related to the selected first specific signal and the corresponding second specific signal would be displayed on the screens 35, 36. In addition, the time difference between the first specific signal S1 and the second specific signal S4 or other related information would be also displayed on the screens 35, 36.

However, the signal retrieved by the logic analyzer 20 is not limited to pocket formats. For example, when the digital device 10 to be analyzed is a mouse or a joystick, the signal between the keys and the main circuit formed thereon is transmitted in the form of spike signals. Under such as circumstance, the user can change the settings of the server 30 to select spike signals. Thereafter, the reliability or performance of the main circuit also can be analyzed.

In addition, in this embodiment, the server 30 reads and analyzes one byte (8 bits) or two bytes (16 bits) of the signal data per time, rather than reading and analyzing one bit of data per time as utilized in the conventional arts. Therefore, the signal processing speed can be increased.

An additional feature includes the code design for the reading and interpretive programs of the server 30 can be modified. The conditional expression "If_Then_Else" contained in the programs which occupy more clock cycles of CPU can be replaced with a correspondence table to achieve the same function. The benefit of utilizing the correspondence table can avoid the program occupying too much clock cycles so as to increase the signal processing speed.

Figure 6:
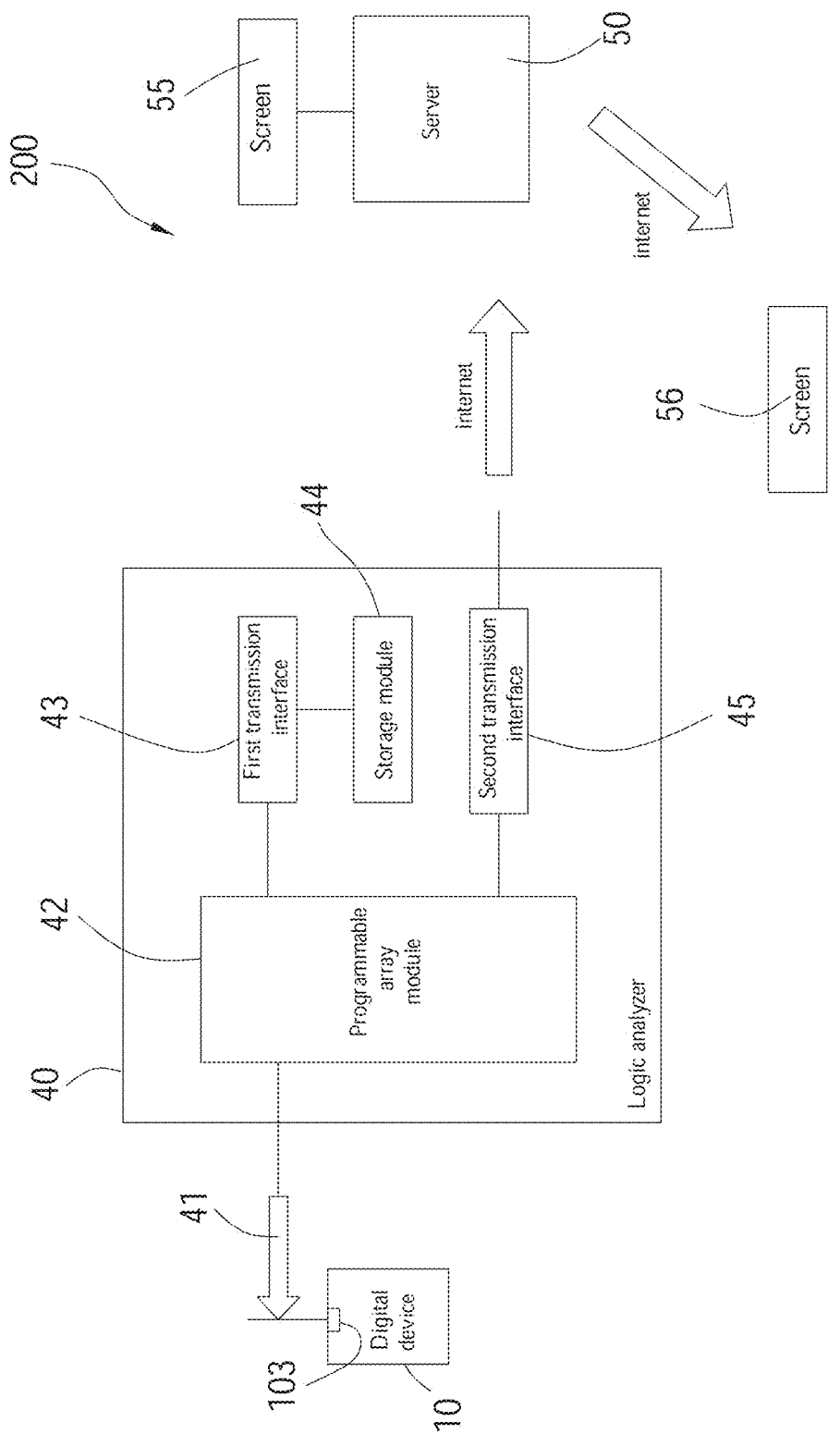

As shown in FIG. 6, a reliability and performance analysis system 200 of a second embodiment according to the present invention is illustrated. It is different from the first embodiment in that the logic analyzer 40 only includes one probe 41. The probe 41 is electrically connected to a transmittal terminal 103 and is adapted to continuously retrieve a plurality of input signals received by the transmittal terminal 103 and a plurality of output signals transmitted from the transmittal terminal 103. The logic analyzer 40 also can upload the signal data to the server 50 to proceed the analysis process.

The transmittal terminal 103 is also a USB connection port. Under normal conditions, the transmittal terminal 103 needs to respond a handshake pocket to each pocket of signals transmitted from the outside. Hence, the user can define each of the pockets of signal transmitted from the outside as a first specific signal, and define the handshake pocket as a second specific signal. By comparing the quantity and time difference between the first specific signal and the second specific signal, an error rate and a response time of the transmittal terminal 103 can be obtained.

Figure 7:
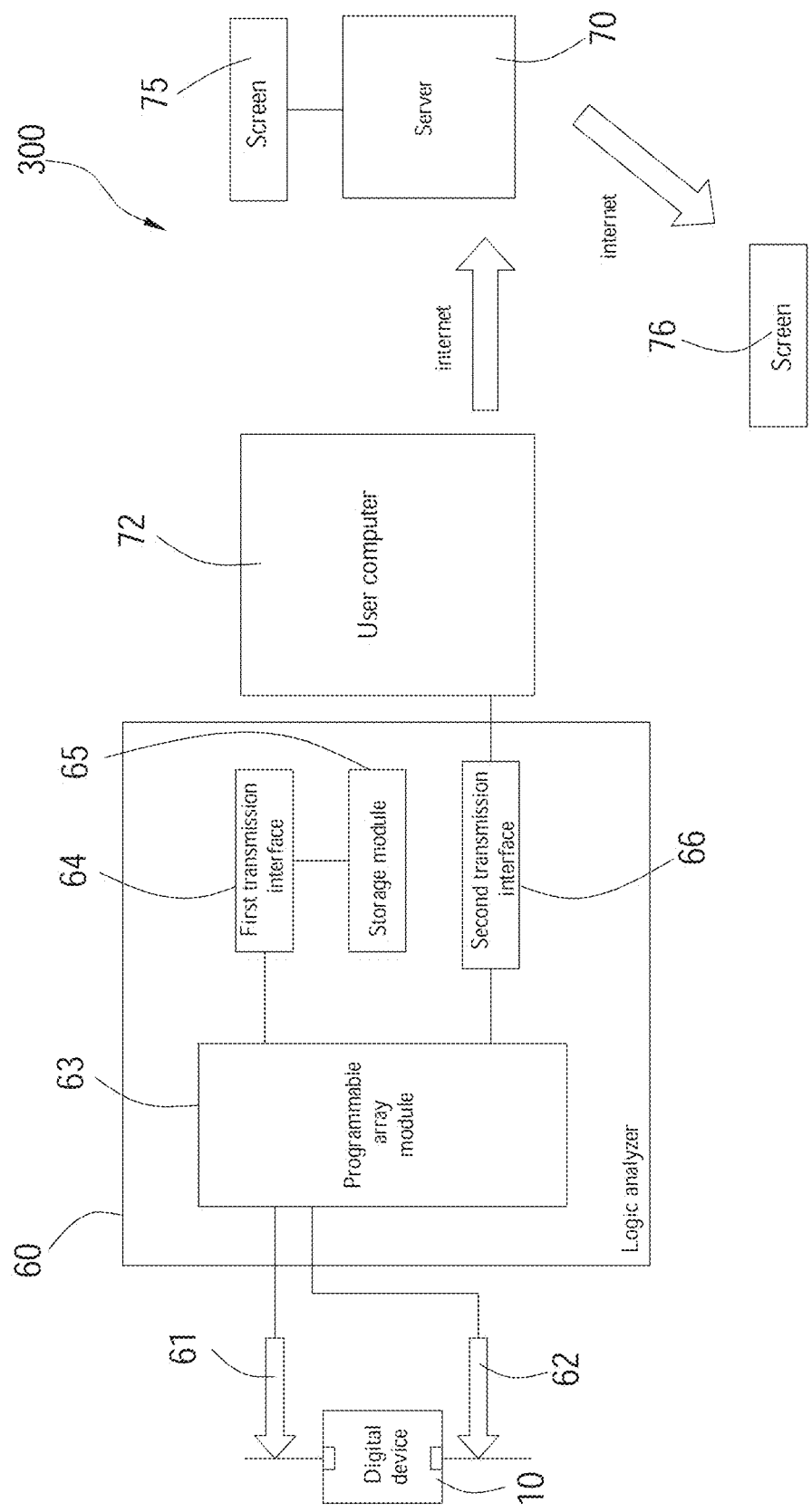
FIG. 7 is a block diagram of a reliability and performance analysis system of a third embodiment according to the present invention.

As shown in FIG. 7, a reliability and performance analysis system 300 of a third embodiment according to the present invention is illustrated. The reliability and performance analysis system 300 is similar to the above embodiments, and it is different from the above embodiments in that the reliability and performance analysis system 300 further includes a user computer 72 in addition to a logic analyzer 60, a server 70 and two screens 75, 76. The user computer 72 is electrically connected to a second transmission interface 66 of the logic analyzer 60. The user computer 72 is adapted to receive and store the signal data transmitted from the logic analyzer 60 and to transmit the signal data to the server 70 located at a remote end.

The benefit of utilizing the user computer 72 is to compress and encrypt the signal data before transmitting it to the server 70 so as to increase the efficiency and safety of data transmission. Besides, if the size of the signal data is too large, the signal data can be divided into plural files that have the same size by the user computer 72 in time sequence. The plural files can be separately stored into the hard disk of the user computer 72 or be transmitted to the server 70 in series. Hence, it is not necessary for the server 70 to read a large amount of data in each time of selecting the first and the second specific signals so as to effectively improve the analysis speed of the server 70.

Moreover, a reliability and performance analysis system (not shown) of a fourth embodiment according to the present invention is similar to the systems of the above embodiments except that the step of selecting the first and the second specific signals and the step of comparing the first and the second specific signals to generate a statistic result are proceeded in the user computer. After generating the statistic result, the statistic result is transmitted from the user computer to the server located at a remote end.

It must be pointed out that the embodiments described above are only some embodiments of the present invention. All equivalent structures which employ the concepts disclosed in this specification and the appended claims should fall within the scope of the present invention.

What is claimed is:

1. A reliability and performance analysis system, adapted to analyze a digital device having at least a transmittal terminal, comprising:
    a logic analyzer, including:
        a set of probes, electrically connected to the transmittal terminal of the digital device and adapted to continuously retrieve a plurality of input signals received by the transmittal terminal and a plurality of output signals transmitted from the transmittal terminal;
        a programmable array module, electrically connected to the set of probes and adapted to receive the plurality of input signals and the plurality of output signals which are retrieved by the set of probes, and to integrate the plurality of input signals and the plurality of output signals into a signal data;
        a first transmission interface;
        a storage module, wherein the programmable array module and the storage module are electrically connected with the first transmission interface; the first transmission interface is adapted to receive the signal data transmitted from the programmable array module and to transmit the signal data to the storage module via a first transmission rate to store the signal data into the storage module; and
        a second transmission interface, electrically connected to the programmable array module and adapted to receive the signal data transmitted back from the storage module to the programmable array module through the first transmission interface, and to transmit the signal data to a remote end via a second transmission rate; and
    a server, located at the remote end of the logic analyzer and connected to the second transmission interface of the logic analyzer via an internet connection, wherein the server is adapted to receive the signal data transmitted from the logic analyzer, select a plurality of first specific signals from the plurality of input signals and a plurality of second specific signals from the plurality of output signals which are corresponding to the plurality of first specific signals, and compare the plurality of first specific signals and the plurality of second specific signals to generate a statistic result.

2. The reliability and performance analysis system of claim 1, further comprising a screen connected to the server.

3. The reliability and performance analysis system of claim 2, wherein the screen is located at a remote end from the server.

4. The reliability and performance analysis system of claim 1, wherein the second transmission rate is not greater than the first transmission rate.

5. The reliability and performance analysis system of claim 1, wherein the programmable array module comprises a conversion circuit, a first buffer circuit and a second buffer circuit; the conversion circuit is electrically connected to the set of probes, and is adapted to receive the plurality of input signals and the plurality of output signals retrieved by the set of probes, and to integrate the plurality of input signals and the plurality of output signals into the signal data; the conversion circuit and the first transmission interface are electrically connected with the first buffer circuit; the first buffer circuit is adapted to receive the signal data, and to convert the signal data into a first data format and transmit the signal data to the first transmission interface; the first transmission interface and the second transmission interface are electrically connected with the second buffer circuit; the second buffer circuit is adapted to receive the signal data transmitted from the first transmission interface, and to convert the signal data into a second data format and transmit the signal data to the second transmission interface.

6. The reliability and performance analysis system of claim 1, wherein the plurality of second specific signals are handshake pockets.

7. The reliability and performance analysis system of claim 1, wherein the digital device comprises two transmittal terminals; one of the two transmittal terminals is an input terminal, while another one of the two transmittal terminals is an output terminal; the plurality of input signals are received by the input terminals, and the plurality of output signals are transmitted from the output terminals; the step of comparing the plurality of first specific signals and the plurality of second specific signals is to compare a quantity of the plurality of first specific signals and the plurality of second specific signals.

8. The reliability and performance analysis system of claim 1, wherein the digital device comprises two transmittal terminals; one of the two transmittal terminals is an input terminal, while the other one of the two transmittal terminals is an output terminal; the plurality of input signals are received by the input terminals, and the plurality of output signals are transmitted from the output terminals; the step of comparing the plurality of first specific signals and the plurality of second specific signals is to compare a time difference between the plurality of first specific signals and the plurality of second specific signals.

9. A reliability and performance analysis system, adapted to analyze a digital device having at least one transmittal terminal, comprising:
 a logic analyzer, including:
  a set of probes, electrically connected to the transmittal terminal of the digital device, and adapted to continuously retrieve a plurality of input signals received by the transmittal terminal and a plurality of output signals transmitted from the transmittal terminal;
  a programmable array module, electrically connected to the set of probes, and adapted to receive the plurality of input signals and the plurality of output signals retrieved by the set of probes, and to integrate the plurality of input signals and the plurality of output signals into a signal data;
  a first transmission interface;
  a storage module, wherein the programmable array module and the storage module are electrically connected with the first transmission interface; the first transmission interface is adapted to receive the signal data transmitted from the programmable array module and to transmit the signal data to the storage module via a first transmission rate to store the signal data into the storage module; and
  a second transmission interface, electrically connected to the programmable array module, and adapted to receive the signal data transmitted back from the storage module to the programmable array module through the first transmission interface, and to transmit out the signal data via a second transmission rate;
 a user computer, electrically connected to the second transmission interface of the logic analyzer, and adapted to receive and store the signal data transmitted from the logic analyzer and to transmit the signal data to a remote end; and
 a server, located at the remote end of the user computer, and connected to the user computer via an internet connection, wherein the server is adapted to receive the signal data transmitted from the user computer, select a plurality of first specific signals from the plurality of input signals and a plurality of second specific signals from the plurality of output signals which are corresponding to the plurality of first specific signals, and compare the plurality of first specific signals and the plurality of second specific signals to generate a statistic result.

10. The reliability and performance analysis system of claim 9, further comprising a screen connected to the server.

11. The reliability and performance analysis system of claim 9, wherein the second transmission rate is not greater than the first transmission rate.

12. The reliability and performance analysis system of claim 9, wherein the programmable array module comprises a conversion circuit, a first buffer circuit and a second buffer circuit; the conversion circuit is electrically connected to the set of probes, and is adapted to receive the plurality of input signals and the plurality of output signals retrieved by the set of probes, and to integrate the plurality of input signals and the plurality of output signals into the signal data; the conversion circuit and the first transmission interface are electrically connected with the first buffer circuit; the first buffer circuit is adapted to receive the signal data, and to convert the signal data into a first data format and transmit the signal data to the first transmission interface; the first transmission interface and the second transmission interface are electrically connected with the second buffer circuit; the second buffer circuit is adapted to receive the signal data transmitted from the first transmission interface, and to convert the signal data into a second data format and transmit the signal data to the second transmission interface.

13. The reliability and performance analysis system of claim 9, wherein the plurality of second specific signals are handshake pockets.

14. A reliability and performance analysis system, adapted to analyze a digital device having at least one transmittal terminal, comprising:
 a logic analyzer, including:
  a set of probes, electrically connected to the transmittal terminal of the digital device, and adapted to continuously retrieve a plurality of input signals received by the transmittal terminal and a plurality of output signals transmitted from the transmittal terminal;
  a programmable array module, electrically connected to the set of probes, and adapted to receive the plurality of input signals and the plurality of output signals retrieved by the set of probes, and to integrate the plurality of input signals and the plurality of output signals into a signal data;
  a first transmission interface;
  a storage module, wherein the programmable array module and the storage module are electrically connected with the first transmission interface; the first transmission interface is adapted to receive the signal data transmitted from the programmable array module, and to transmit the signal data to the storage module via a first transmission rate to store the signal data into the storage module; and a second transmission interface, electrically connected to the programmable array module, and adapted to receive the signal data transmitted back from the storage module to the programmable array module, and to transmit out the signal data via a second transmission rate;

a user computer, electrically connected to the second transmission interface of the logic analyzer, and adapted to receive the signal data transmitted from the logic analyzer, select a plurality of first specific signals from the plurality of input signals and a plurality of second specific signals from the plurality of output signals which are corresponding to the first specific signals, compare the plurality of first specific signals and the plurality of second specific signals to generate a statistic result, and transmit the statistic result to a remote end; and a server, located at the remote end of the user computer, wherein the server is connected to the user computer via an internet connection and is adapted to receive the statistic result transmitted from the user computer.

15. The reliability and performance analysis system of claim 14, further comprising a screen connected to the server.

16. The reliability and performance analysis system of claim 14, wherein the second transmission rate is not greater than the first transmission rate.

17. The reliability and performance analysis system of claim 14, wherein the programmable array module comprises a conversion circuit, a first buffer circuit and a second buffer circuit; the conversion circuit is electrically connected to the set of probes, and is adapted to receive the plurality of input signals and the plurality of output signals retrieved by the set of probes, and to integrate the plurality of input signals and the plurality of output signals into the signal data; the conversion circuit and the first transmission interface are electrically connected with the first buffer circuit; the first buffer circuit is adapted to receive the signal data, and to convert the signal data into a first data format and transmit the signal data to the first transmission interface; the first transmission interface and the second transmission interface are electrically connected with the second buffer circuit; the second buffer circuit is adapted to receive the signal data transmitted from the first transmission interface, and to convert the signal data into a second data format and transmit the signal data to the second transmission interface.

18. The reliability and performance analysis system of claim 14, wherein the plurality of second specific signals are handshake pockets.

19. The reliability and performance analysis system of claim 14, wherein the digital device comprises two transmittal terminals; one of the two transmittal terminals is an input terminal, while another one of the two transmittal terminals is an output terminal; the plurality of input signals are received by the input terminals, and the plurality of output signals are transmitted from the output terminals; the step of comparing the plurality of first specific signals and the plurality of second specific signals is to compare a quantity of the plurality of first specific signals and the plurality of second specific signals.

20. The reliability and performance analysis system of claim 14, wherein the digital device comprises two transmittal terminals; one of the two transmittal terminals is an input terminal, while the other one of the two transmittal terminals is an output terminal; the plurality of input signals are received by the input terminals, and the plurality of output signals are transmitted from the output terminals; the step of comparing the plurality of first specific signals and the plurality of second specific signals is to compare a time difference between the plurality of first specific signals and the plurality of second specific signals.

* * * * *